May 17, 1966 R. L. CARLSTEDT 3,251,249
METHOD AND APPARATUS FOR CONTROLLING MOVING MEMBERS
Filed March 18, 1963 3 Sheets-Sheet 2
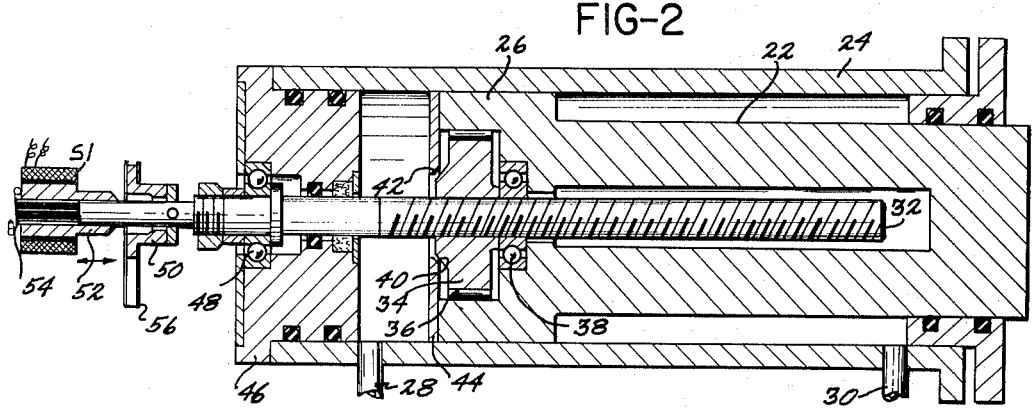
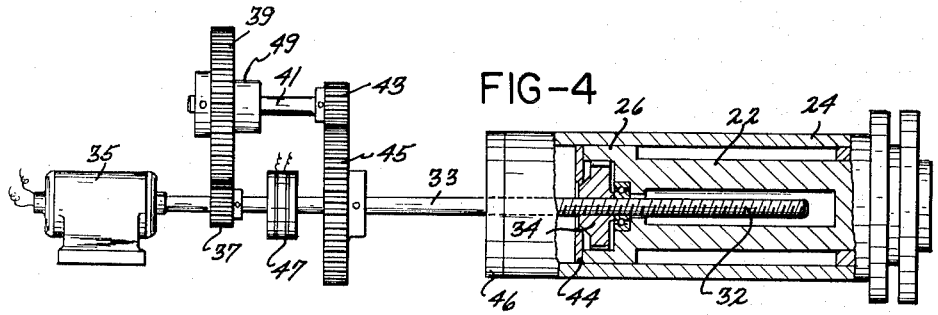
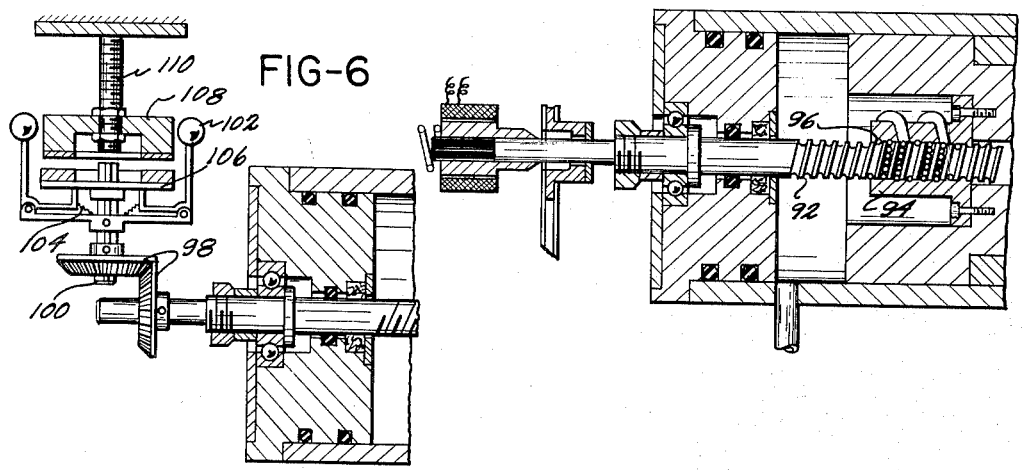
INVENTOR.
RAGNAR L. CARLSTEDT
BY
ATTORNEYS

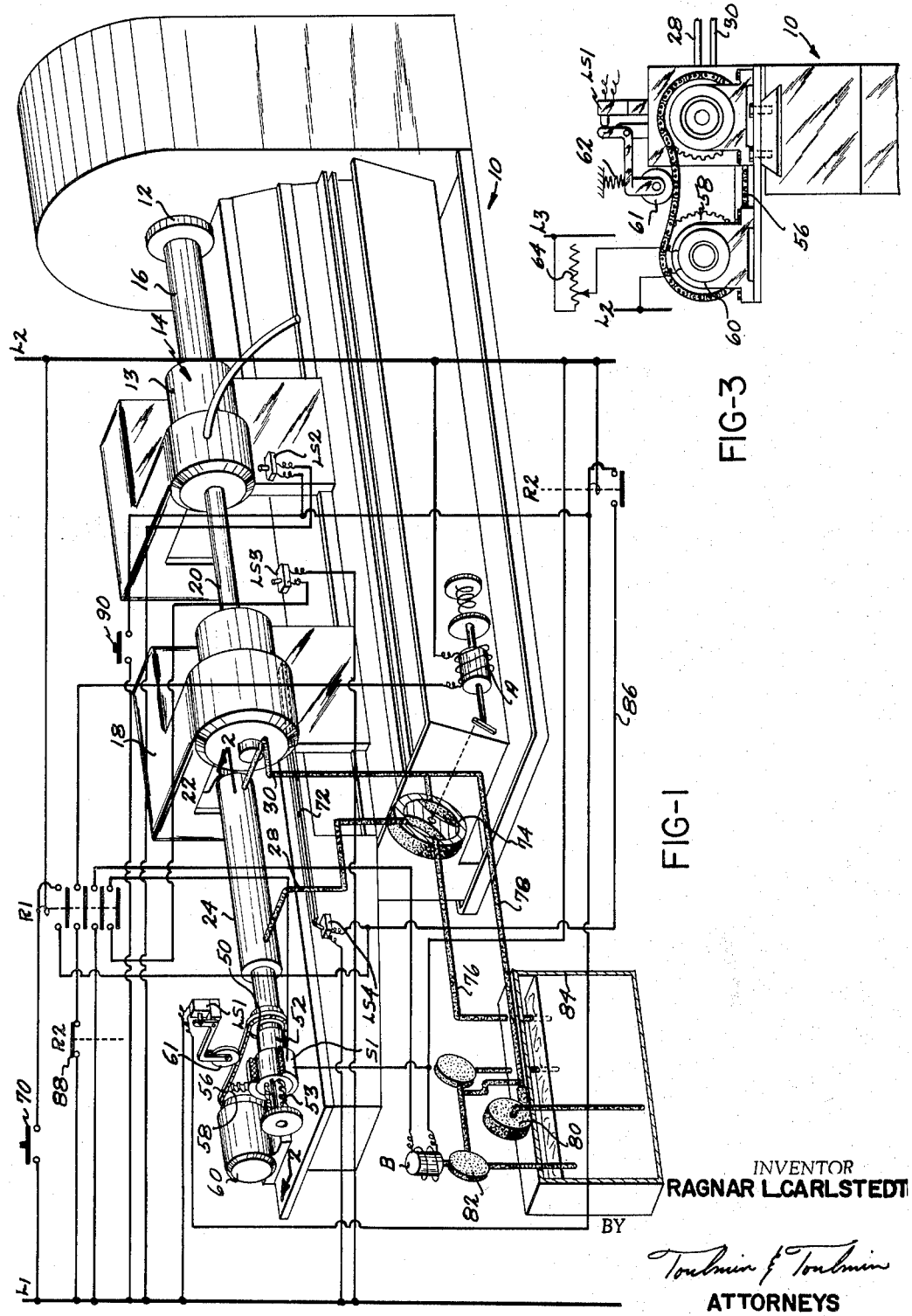

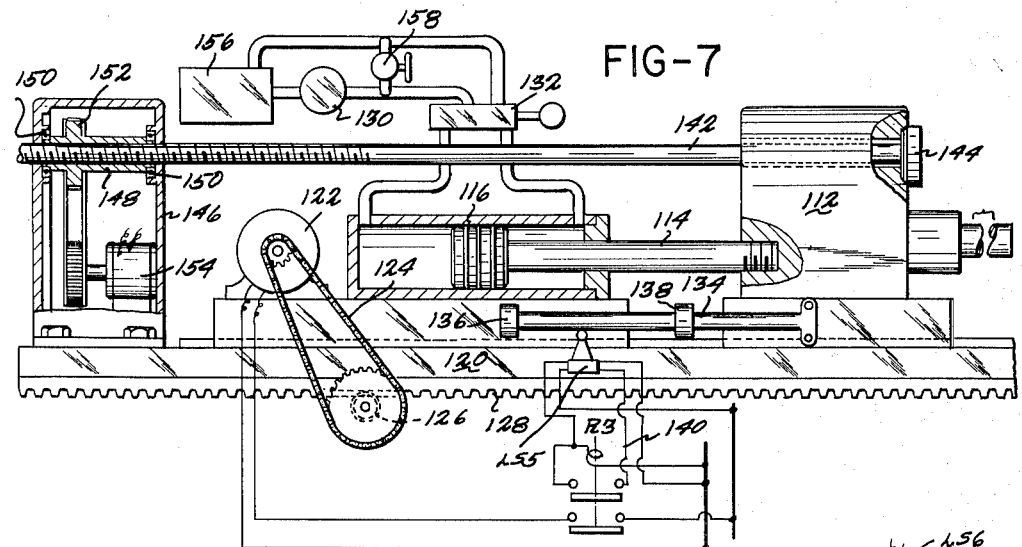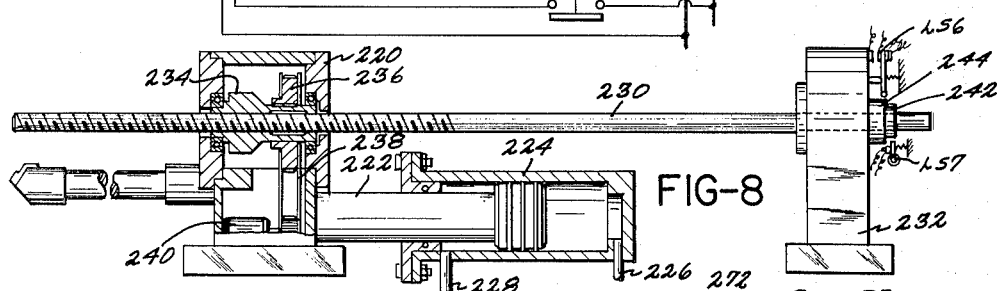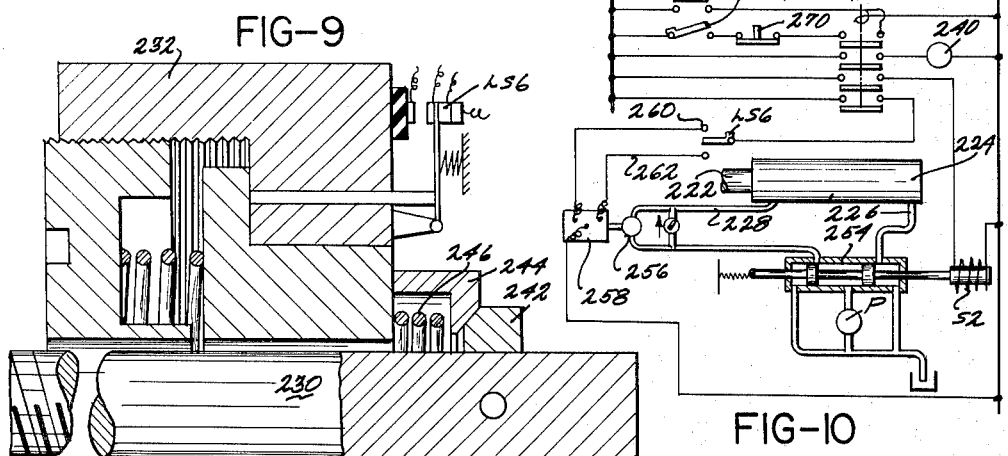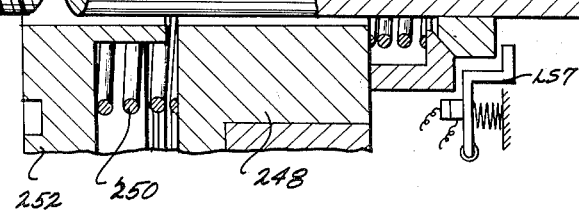

United States Patent Office 3,251,249
Patented May 17, 1966

3,251,249
METHOD AND APPARATUS FOR CONTROLLING MOVING MEMBERS
Ragnar L. Carlstedt, Valley Heights, Ligonier, Pa.
Filed Mar. 18, 1963, Ser. No. 265,672
5 Claims. (Cl. 77—3)

This invention relates to a method and apparatus for controlling movements of movable members and is particularly concerned with the application of such a movement controlling device to the control of the movement of machine tool members and the like.

This application is a continuation-in-part of my copending Serial No. 15,284, entitled Method and Apparatus for Controlling Moving Members, filed March 16, 1960, now Patent No. 3,083,592.

In machine tools relative movements between parts of the machine take place in order to carry out the work operations to be performed. In turning and boring machines, for example, the part of the machine carrying the cutting tool is moved relative to the part of the machine supporting the workpiece so that feed movement of the cutting tool into the workpiece can be obtained.

In other cases the movement of different members of a machine tool or a like organization are to be synchronized which might occur if, for example, it was desired to move a press platen or the like in parallelism with itself while applying force to the platen at spaced points therealong. Heretofore, the exact control of such movements, or the synchronization of such movements of relatively movable members has been difficult and has required the use of extremely expensive control equipment or a compromise between the results desired and the results that can be obtained practically.

With the foregoing in mind, it is a primary object of the present invention to provide an improved arrangement for effecting controls of the nature referred to.

A still further object of the present invention is the provision of an arrangement for exactly controlling of the speed of a movable member which has a driving force that is not in itself controlled.

A still further object of this invention is the provision of a motion controlling mechanism which is widely applicable to the control of the movement of moving members regardless of the manner in which the member is actuated.

It is also an object to provide a device for controlling the speed of movement of a reciprocating member in one direction while not interferring in any way with the speed of movement of the member when it is moving in the opposite direction.

A particular object of this invention is the provision of a mechanism for controlling the speed of movement of a hydraulically actuated member which will in no way interfere with the operation of the hydraulic system.

A still further object of this invention is the provision of a control mechanism for regulating the speed of a moving object which will also serve to indicate changes in working condition of the moving member such as would occur when a drill breaks through a workpiece or becomes dull or the like.

These and other objects and advantages will become more apparent upon reference to the drawings in which:

FIGURE 1 is a diagrammatic representation of a machine according to my invention and of the hydraulic and electric control circuits that can be used therewith;

FIGURE 2 is a sectional view indicated by line 2—2 on FIGURE 1 showing the construction of the hydraulic motor and screw control arrangement therefor;

FIGURE 3 is a view looking in at the left end of the machine of FIGURE 1;

FIGURE 4 is a diagrammatic view of a modification;

FIGURE 5 is a view showing a modified construction for the nut and screw;

FIGURE 6 is a fragmentary view showing a modified arrangement for controlling the speed of rotation of the control screw;

FIGURE 7 is a more or less diagrammatic view showing the application of a control mechanism according to the present invention to an extremely long bed machine;

FIGURE 8 is a sectional view showing a control device according to the present invention in which the control device also operates to detect the dulling of a tool carried by the controlled member;

FIGURE 9 is a sectional view drawn at enlarged scale through the portion of the device of FIGURE 8; and FIGURE 10 is a diagrammatic view showing the electrical and hydraulic actuating circuit of the FIGURE 8 modification.

The present invention is concerned with a method and mechanism for controlling the speed of movement of a member such as the tool slide or the like of a machine tool or similar mechanism. The present invention proposes to effect such control by connecting between the member and another member, which may be stationary, relative to which the speed of the movable members to be controlled, a nut and screw so that the movement of the movable member can take place only as fast as the screw advances through the nut.

By controlling the rate of relative rotation between the screw and nut, the speed of movement of the movable member can be controlled with accuracy. Usually, hydraulic means are employed to actuate the movable member so that the nut and screw mechanism is required only to control the speed of movement of the member.

Usually, the speed control will be effected in one direction of movement only of the movable member and accordingly, the nut and screw are preferably of the type in which either can drive the other whereby movement of the movable member in the opposite direction can be accomplished by high speed by permitting one or both of the nut and screw to spin freely while being driven by the other.

In a modified application of the invention, particularly where the screw is extremely long, instead of permitting one or both of the nut and screw to spin freely during retraction of the controlled member, the screw is permitted to move longitudinally relative to one of the members and is then readjusted prior to the time that the controlled member again commences an advancing movement.

In a still further application of the present invention, a member having a relatively long stroke is actuated by a relatively short stroke hydraulic motor with the speed of the member being regulated by a long screw and with there being provided an arrangement for periodically adjusting the position of the short stroke motor so that the motor will advance stepwise while the controlled member advances under continuous control of the screw.

In a still further embodiment of the present invention, the tension asserted on the screw by the member being controlled is utilized for controlling the application of power to the hydraulic drive motor that actuates the member whereby the tension on the screw is maintained within predetermined limits.

Tendency for the screw to move in the axial direction opposite to the direction of movement of the member being controlled can be utilized, in any of the modifications referred to, for interrupting the operation being carried out, such tendency of the screw to move in a direction opposite to the direction of movement of the controlled member indicating that the controlled member has slowed down as could be brought about by drilling of a cutting tool or the like.

Referring to the drawings somewhat more in detail, FIGURE 1 shows a machine which forms an ideal opportunity for the practice of the present invention. The machine illustrated in FIGURE 1 is a deep hole boring or drilling machine in which a workpiece is supported and rotated on its axis while a non-rotating boring or drilling tool is thrust aixally into the workpiece.

This produces highly accurate smoothly furnished straight portion at a high rate of speed and permits holes or bores of great length to be formed in workpieces.

In FIGURE 1 the machine has a bed 10 and at one end thereof is a spindle 12 which is driven in rotation. Slidable on bed 10 is clamp 14 having a clamp element at 13 for engaging the end of workpiece 16 opposite the end thereof engaged by spindle 12. Element 13 is rotatable so that rotation of spindle 12 will cause rotation of workpiece 16.

Slidable on bed 10 is a boring slide 18 and carried thereby is boring tool or drilling 20 which extends axially through clamp slide 14 for engagement with workpiece 16 to drill a hole therein.

Bed 10 carries a hydraulic motor 24 having a ram 22 extending therefrom and connected with boring slide 18 for actuating the latter. Conduit means 28 and 30 leading to motor 24 provide for reversible actuation thereof.

Reference to FIGURES 1–3 will reveal that ram 22 has a head 26 thereon forming a piston in cylinder 24 so that fluid can be supplied to the advancing side of piston 26 by conduit 28 and to the retracting side thereof by a conduit 30.

The piston and ram 22 are bored from the piston end and extending therein is screw 32. This screw threads through a nut 34 rotatably mounted in the piston and supported therein on anti-friction bearings such as needle bearings 36. There is also a ball bearing at 38 which becomes effective when the piston is moving leftwardly and is exerting force on the nut. The left face of the nut is provided with a conical clutch surface 40 adapted for cooperating with a complementary tapering clutch surface 42 formed in a plate 44 attached to the piston, and in addition to serving as a clutch plate, also retaining the nut in the piston.

When the piston moves rightwardly, the aforementioned clutch faces will be brought into engagement and will non-rotatably connect the nut with the piston, whereas, when the piston moves leftwardly the nut comes into engagement with bearing 38 and becomes rotatably connected with the piston.

Screw 32 extends out through cylinder head 46 and is sealed thereto and is rotatably supported therein by bearings 48.

Externally of the cylinder, screw 32 has rotatably mounted thereon a sprocket 50 that is adapted for being drivingly engaged with a clutch member 52 that is splined to screw 32 as at 54. Movement of the clutch member 52 into driving engagement with sprocket 50 is accomplished by spring 53 while energization of solenoid S1 will withdraw clutch member 52 from the sprocket 50 and interrupt the driving connection therebetween.

As will be seen in FIGURES 1 and 3, there is a chain 56 passing about sprocket 50 and leading over sprocket 58 driven by a motor 60. On what is normally the slack side of the chain when the piston 26 and the ram 22 are advancing rightwardly, there bears a roller 61 urged against the chain by a spring 62. This roller 61 is mounted on an arm having a portion adjacent the operating plunger of a limit switch LS1. When the chain is slack on the roller side, the arm is spaced from the limit switch but when the slack side of the chain becomes taut, the roller will be lifted and the arm will actuate switch LS1. This can be availed of for indicating when the advance of the ram 22 slows down on account of the tool becoming dull or on account of there being a hard spot in the workpiece or the like.

What occurs is that when the ram is advancing normally, the screw is under tension and this tends to draw the lower reach of the chain taut with the speed or rotation of motor 60 controlling the paying out of the chain thereby to control the speed of rotation of screw 32 thus to permit advancing movement of ram 22 at the desired rate.

However, when the speed of movement of the ram is slowed down, the tension on the screw is relaxed and the condition at the chain changes from that wherein the lower reach of the chain is under tension and instead the upper reach is under tension and this causes switch LS1 to be actuated.

The speed of rotation of the motor 60 can be effected according to any well known means, such as a rheostat 64. Motor 60 could also be a constant speed motor with there being a speed varying mechanism located between the output shaft of motor 60 and the sprocket 58 driven thereby.

A typical hydraulic and electric circuit for the modification of FIGURES 1 through 3 is illustrated in FIGURE 1. The power lines are indicated at L1 and L2 and therebetween is connected a normally open start switch 70 in series with the energizing coil of a relay R1 which includes a holding circuit in which there is a normally closed limit switch LS4 adapted for being opened by a cam member 72 carried by boring slide 18 in its fully retracted position.

Relay R1 when closed closes circuits through the valve solenoids A and B and through the clutch solenoid S1 previously referred to.

Valve solenoid A pertains to a valve 74 which is normally positioned to connect conduit 28 leading to the advancing side of piston 26 to the exhaust conduit 76. Energization of solenoid A, however, shifts valve 74 into position to connect conduit 28 with pressure conduit 78 leading to the discharge side of pump 80, and which pressure conduit is continuously connected to conduit 30 leading to the retraction side of piston 26.

Valve solenoid B is associated with a by-pass valve 82 which is normally open to by-pass the delivery of the pump back to reservoir 84 but which, upon energization of solenoid B, closes to interrupt the said by-pass.

In circuit with solenoid S1 pertaining to the clutch is a normally closed limit switch LS3 adapted for being opened by cam 72 when the boring slide reaches the position where it is desired for feed movement to commence. When the boring slide initiates its advancing movement by closing a switch 70, solenoid S1 is energized together with solenoids A and B so the ram will advance at high speed. When switch LS3 is opened, however, and solenoid S1 is de-energized, clutch member 52 will move into engagement with sprocket 50 thus commencing rotation of screw 32 at a controlled speed, whereby the speed of advance of the boring slide is regulated by the speed of rotation of the screw.

When the boring slide advances to a point where it will engage limit switch LS2 indicating that the feed movement has proceeded the desired amount, the energizing coil for relay R2 is energized and this relay closes and holds closed through a holding circuit that includes wire 86 leading to switch LS4. Closing of relay R2 opens a blade 88 thereof so that valve solenoid A is de-energized while solenoid B remains energized.

Valve 74 now shifts to exhaust the advancing side of piston 26 so the piston and the boring slide connected therewith will move rapidly in the retracting direction. Rapid movement is possible at this time because the nut 34 is unclutched from clutch plate 44 and is free to spin in the piston so that there is no restriction of the rate of movement of piston 26 and boring slide 18.

When the boring slide has reached its fully retracted position, switch LS4 will be opened and this will de-energize both relays R1 and R2 and the system will come to rest with valve solenoid B being de-energized and by-passing the entire delivery of pump 80 to reservoir 84.

In addition to relay R2 being energizable by closing of switch LS2, it can also be energized by closing of the normally open manual switch 90 should it be desired to initiate retraction manually, or it can be energized by closing of the previously mentioned normally open switch LS1 when the advancing movement of the boring slide is slowed down as by the cutting tool becoming dull or encountering hard spots in the workpiece being operated.

In certain instances it may not be desirable at any time to unclutch the screw from its drive motor. For example, in order to avoid jumping or any delay in shifting over from fast traverse to feed it is preferable to maintain the screw under control at all times. An arrangement for accomplishing this is illustrated in FIGURE 4. In FIGURE 4 the screw is identified at 33 and the drive motor therefor is identified at 35. Drive motor 35 drives a pinion 37 that meshes with a larger gear 39 which is mounted on a shaft 41 together with another pinion 43. Pinion 43 meshes with a larger gear 45 attached to screw 33. A drive of this arrangement will normally give a substantial reduction in speed between the speed of the motor shaft and the speed of the screw and the gears and pinions are so selected that it reduces motor speed so that the speed of the screw is the desired feed speed.

For fast traverse or rapid advance of the member controlled by the screw according to the FIGURE 4 modification, high speed rotation of th screw by the motor is obtained by actuation of a clutch 47, which may be either mechanical or electrical, in which clutch when actuated will directly connect the motor shaft with the screw 33 and thus rotate it at high speed. When the screw is running at high speed, some compensation must be made for the fact that the aforementioned gears and pinions all remain in mesh.

This compensation is provided for by an over-running clutch 49, which may be of the Sprag type and which will permit the screw 33 to be driven at the aforementioned high speed.

The described arrangement thus provides for control of the screw at all times and the shifting over from rapid advance to feed can be accomplished without any jumping of the controlled member.

While any accurately formed nut screw can be utilized in the practice of the present invention, and particularly nuts and screws which are mutually driveable by the other, I prefer to employ what is known in the trade as a "Saginaw" screw, which is rather diagrammatically illustrated in FIGURE 5.

A screw of this nature has a thread 92 formed thereon which is essentially a half round ball bearing track and the nut 94 pertaining to the screw has a track means for circulating balls 96 which run in the track 92. This makes for a very low friction free running arrangement which is ideally suited to the practice of the present invention.

In the modification of FIGURE 5, the nut 94 can be fixed to the piston and the screw permitted to turn so that during retraction movement it is the screw which spins rather than the nut.

In the previously described modifications the control of the speed of rotation of the screw has been effected by a variable speed motor but it is also contemplated to control the speed of the screw by a governor or the like as illustrated in FIGURE 6 thereby eliminating the necessity for using a motor.

In FIGURE 6 bevel gears 98 connect the screw with a governer shaft 100 which carries the flyballs 102. When the flyballs move outwardly against the bias of their springs 104, the plate 106 splined to shaft 100 moves upwardly and at a predetermined speed engages a break plate 108 thereby limiting the speed of rotation of the screw.

Brake plate 108 is adjustable by screw threaded means 110 to vary the said predetermined speed.

The arrangement of FIGURE 6 is directly applicable to the first described modification and can be made applicable to the FIGURE 5 modification by including a clutch between the governor shaft and the controlled screw.

In FIGURE 7 there is shown a modification wherein the control mechanism of the present invention is utilized for controlling the speed of movement of a member over a long distance while permitting the use of a relatively short hydraulic motor to advance the member. This is accomplished by attaching to the member 112 which is to be controlled a double acting ram 114 of a hydraulic motor that includes a cylinder 116. This motor is relatively short and the cylinder is mounted on a slide 118 slidable on the machine bed 120. The slide also carries a motor 122 connected by a chain 124 with a sprocket mounted on a shaft together with a pinion 126 that engages a rack 128 attached to the bed 120. The cylinder 116 is reversibly supplied with fluid from a pump 130 via a simple four-way reversing valve 132.

The member 112 has a rod 134 connected therewith having spaced cams 136 and 138 adapted for engagement with a limit switch LS5 on member 118 which, when engaged by the cam 136 effects energization of the operating coil of relay R3 which has a holding circuit that includes a wire 140 extending through the limit switch and which holding circuit is adapted for being interrupted when the limit switch is engaged by cam 138.

Relay R3 when energized closes the energizing circuit to motor 122 to cause the motor to run in a direction to advance slide 118 toward member 112.

Also associated with member 112 is the elongated threaded control rod 142 which extends through the member and has disc like head 144 which clutches rod 142 to the member when the member is pressing rightwardly against head 144.

Threaded rod 142 extends through a stationary frame 146 within which, as will be seen in FIGURE 7 there is a nut 148 threadedly engaging the rod and supported on anti-friction bearings 150 and having a sprocket portion 152 engaged by a chain driven by motor 154. It will be evident that advancing movement of member 112 can take place only as rapidly as nut 148 will permit the threaded rod 142 to move rightwardly. This, of course, is determined by the speed of rotation of motor 154 which is variable as by a rheostat, or as by a speed changing transmission between the motor and the nut.

In operation, movement rightwardly of member 112 is commenced by shifting valve 132 to supply pressure fluid to the left side of double acting ram 114. With the ram so pressurized, rightward movement of member 112 will commence and at a rate determined by the speed of rotation of nut 148. When member 112 is advanced rightwardly to the point that switch LS5 is actuated by cam 136, relay R3 will be energized to bring about energization of motor 122 which will then drive slide 118 toward member 112. Member 112, however, is constrained to move at the fixed predetermined rate determined by the speed of rotation of the nut 148 and accordingly the rightward movement of slide 118 referred to will be accompanied by movement of cylinder 116 over double acting ram 114 toward the right. The fluid displaced from the left end of cylinder 116 during this movement can be by-passed back to reservoir 156 via pressure relief valve 158.

When the described movement of the slide 118 toward member 112 has brought cam 138 into engagement with switch LS5, relay R3 will be de-energized thus de-energizing motor 122 and bring the slide to a halt.

The aforementioned cycle will obtain repetitively until desired total travel of member 112 is executed.

It will be understood that de-energization of motor 122 will serve to lock slide 118 in place which could be accomplished as, for example, motor 122 being a geared head motor with self-locking worm gears between the armature and the output shaft. It will also be understood automatic controls could be provided for limiting the total movement of member 112 and for interrupting the movement at will or upon the tool 160 carried thereby encountering more than a predetermined resistance. In any case, however, during the advancing movement of member 112, it will move at a fixed rate of speed.

During retracting movement of member 112 it will merely slide over threaded control rod 142, with the control rod being returned to starting position by reversing of the drive means 154.

FIGURES 8 through 10 show still another modified arrangement of the present invention wherein means are provided for regulating the tension on the screw during advancing movement of the controlled member.

In FIGURE 8 the movable member to be controlled is indicated at 220 and it is attached to double acting ram 222 of a hydraulic motor having a cylinder 224 into which extends a conduit 226 to supply fluid to advance the ram and member and a conduit 228 which supplies fluid to the cylinder 224 for retracting the ram and member.

In FIGURE 8 the movable member to be controlled is indicated at 220 and it is attached to double acting ram 222 of a hydraulic motor having a cylinder 224 into which extends a conduit 226 to supply fluid to advance the ram and member and a conduit 228 which supplies fluid to the cylinder 224 for retracting the ram and member.

The threaded control rod or screw 230 passes through a stationary element 232 and also through the member 220.

Within member 220 the screw threadedly engages a nut 234 that comprises a sprocket 236 driven by a chain 238 which in turn is driven by a power means 240 such as a motor.

With reference to member 232, as will be seen in FIGURE 9, rod 230 extends therethrough and at the rear of member 232 has attached thereto a collar 242 that bears against the outside of a cup 244 in which is a spring 246 urging the cup, collar, and threaded control rod rightwardly.

Cup 244 bears on a block 248 which is reciprocable in member 232 and urged toward the right by a compression spring 250, the bias of which is adjustable by nut 252. It will be apparent that the support for the screw is such that it will yield leftwardly under a predetermined high tension and will yield rightwardly under a predetermined low tension.

These characteristics are availed of for controlling the tension exerted on the threaded rod so that it can be kept within predetermined limits. This is done by providing a normally open limit switch LS6 which is adapted for closing when block 248 moves leftwardly indicating that the rod 230 is under a predetermined high tension.

Similarly, there is provided a normally closed limit switch LS7 which is adapted for being opened when threaded rod 230 moves rightwardly indicating that it is being fed through nut 234 at a greater rate than slide 220 is advancing.

The hydraulic and electrical control circuit in FIGURE 10 shows how these switches are employed for control purposes.

In this figure it will be seen that the reversing valve 254 is connected so that when the solenoid S2 is energized the valve will shift to supply pressure fluid to the advancing side of ram 224 to cause member 220 to advance.

As the ram advances, the motor 240 which is energized simultaneously with solenoid S2 causes the nut 234 to rotate to feed screw 230 thus permitting member 220 to advance at a predetermined rate.

During the advancing movement of member 220 and ram 222 fluid from the retraction side of the ram is discharged through a restrictor valve 256. This valve has attached thereto an adjusting motor 258 which is reversible so that the degree of restriction of the valve can be varied.

If, during the advancing movement of member 220, the tension on screw 230 exceeds a predetermined amount, the screw will move leftwardly carrying with it block 248 and this will permit switch LS6 to close on its contact 260 which will energize motor 258 to run in a direction to increase the degree of restriction of valve 256. This will cause more resistance to develop to the movement of ram 222 and thus reduce the tension on screw 230. If, on the other hand, the tension on the screw is substantially less than the aforementioned tension, it will push the screw 230 rightwardly together with block 248 toward its FIGURE 16 position and this will close limit switch LS6 on its contact 262 and cause motor 258 to run in the opposite direction thus decreasing the degree of restriction of valve 256 and decreasing the resistance to the advancing movement of the ram 22.

In this manner the tension on the screw can be maintained within predetermined close limits at all times.

Should the movement of the member 220 be slowed down or halted as by going against a stop, or by the tool carried thereby becoming dull, or there being a hard spot encountered in the workpiece being operated, the nut 234 rotating on the screw, will drive the screw 230 to move rightwardly and to engage the open limit switch LS7 which will bring about de-energization of the control relay R3 which will de-energize valve solenoid S2 and thus cause the member 220 and ram 222 to retract.

During this retracting movement nut 234, if disengaged from the drive motor, may spin freely on screw 230, or it may disengage therefrom, or motor 240 may be driven in the reverse direction.

The member 220 and ram 222 may be caused to retract by operating manual switch 270 if so desired.

A new cycle can be initiated at any time by closing start switch 272 to energize relay R3 which will energize motor 240, valve solenoid S2, and establish the energizing circuit for motor 258.

In the several modifiications referred to above there have been shown ball bearing, nuts and scresw, and other substantially conventional types of nuts, but it will be understood that special collapsible nuts could be employed such as the half nuts used in the apron of a lathe carriage.

It is preferable for the nut to remain continuously in engagement with the screw since no problems of re-engagement are introduced but it will also be evident that in many cases half nuts could be employed to disengage the screw entirely during the retracting movement and that ample opportunity would be available for re-engageing the screw before it was necessary for the nut to commence exercising the described control.

In all cases, the screw can be relatively small because the only substantial loads thereon are those that are imposed on the screw in tension with the screw being substantially unloaded during retraction of the controlled member.

It will be evident that in substantially every case the control of the speed of the screw or nut could be accomplised in a number of ways, such as by a variable speed electric or hydraulic motor, or by variable speed mechanical, hydraulic, or electrical transmissions connecting the drive motor with the driven one of the screw and nut, or by adjustable governor means.

It will also be evident that while the present invention has been particularly illustrated and described in connection with controlling the movable parts of machine tools, the same mechanism could be utilized in any other circumstance in which it was desired accurately to control the speed of movement of a member or to retain the speed ratio between two or more movable members.

It will be understood that this invention is susceptible to modification in order to adapt it to different usages and conditions; and, accordingly, it is desired to com-

I claim:

1. In combination; first and second relatively movable members, a nut associated with one of said members, a screw threaded in the nut associated with the other of said members, said screw and nut being attached to their respective members so as to be substantially immovable relative thereto in the axial direction of the the screw, hydraulic motor means to drive said members relatively, control means and drive means independent of said hydraulic motor means pertaining to one of said nut and screw to effect controlled relative rotation of the nut and screw thereby to control the rate of relative movement of said members under the influence of said hydraulic motor means in one direction of relative movement of said members, said nut and screw being of the non-self-locking type, and means operable in the other direction of relative movement of said members for making said control means ineffective thereby to permit unrestrained relative movement of said members in the said other direction, the said means for making said control means ineffective comprising means for permitting one of said nut and screw to spin freely during movement of said members relatively in the said other direction, said drive means including a drive motor for the screw, a first drive connection including a selectively operable clutch between the motor and the screw, and a second drive connection between the motor and the screw in parallel with said selectively operable clutch and including an over-running clutch effective for transmitting power only when said selectively operable clutch is disengaged.

2. In combination; first and second relatively movable members, a nut associated with one of said members, a screw threaded in the nut associated with the other of said members, said nut and screw being attached to the pertaining members so as to be fixed against axial movement relative thereto in at least one axial direction of the screw, hydraulic means to drive said members relatively, drive means independent of said hydraulic means pertaining to one of said nut and screw thereby to control the rate of relative movement of said members under the influence of said hydraulic means in one direction of relative movement of said members, and means operable in the other direction of relative movement of said members for making said drive means ineffective thereby to permit unrestrained relative movement of said members in the said other direction, said means for making said drive means ineffective comprising means for permitting free relative movement between one of said nut and screw and the pertaining one of said members during relative movement of said members in said other direction, said drive means including a drive motor for the screw, a first drive connection including a selectively operable clutch between the motor and the screw, and a second drive connection between the motor and the screw in parallel with said selectively operable clutch and including an over-running clutch effective for transmitting power only when said selectively operable clutch is disengaged.

3. In combination; a hydraulic motor comprising a cylinder and a ram therein, a screw extending parallel with said ram and a nut in which the screw is threaded, one of said screw and nut being movable with said ram and the other being connected with said cylinder, drive means operable in one direction of movement of the ram in the cylinder for driving the screw in rotation at a predetermined controlled rate thereby to control the rate of movement of the ram in the cylinder, means operable during movement of the ram in the cylinder in the opposite direction for releasing one of said nut and screw from the ram or cylinder to which it is attached to permit unrestrained movement of the ram in the said other direction, said drive means including a drive motor for the screw, a first drive connection including a selectively operable clutch between the motor and the screw, and a second drive connection between the motor and the screw in parallel with said selectively operable clutch and including an over-running clutch effective for transmitting power only when said selectively operable clutch is disengaged.

4. In combination; a hydraulic motor comprising a cylinder and a ram therein, said cylinder having a head at one end and said ram extending out the other end thereof, a screw extending through the head of the cylinder and into the ram, a nut in the ram threaded on the screw, means rotatably supporting the screw in the cylinder against axial movement therein, a thrust bearing on one side of the nut between the nut and the ram whereby movement of the ram in one direction in the cylinder will rotatably connect the nut with the ram, cooperating elements of a clutch between the other side of the nut and the ram whereby movement of the ram in the other direction in the cylinder will non-rotatably connect the nut with the ram, a motor for driving said screw, a speed reducing drive train connected at one end to the motor and at the other end to the screw for driving the screw at reduced speed, first clutch means selectively operable for effecting a direct connection between the motor and the screw for driving the screw at high speed, and second clutch means in the form of an over-running clutch in said drive train to permit the said high speed of the screw without disconnecting said drive train.

5. In combination; a hydraulic motor comprising a cylinder and a ram therein, said cylinder having a head at one end and said ram extending out the other end thereof, a screw extending through the head of the cylinder and into the ram, a nut in the ram threaded on the screw, means rotatably supporting the screw in the cylinder against axial movement therein, a thrust bearing on one side of the nut between the nut and the ram whereby movement of the ram in one direction in the cylinder will rotatably connect the nut with the ram, cooperating elements of a clutch between the other side of the nut and the ram whereby movement of the ram in the other direction in the cylinder will non-rotatably connect the nut with the ram, a motor having its output shaft axially aligned with said screw, a pinion on the motor shaft, a first gear driven by said pinion, a second pinion connected with said first gear for rotation therewith, a second gear meshing with said second pinion and mounted on said screw, clutch means between the motor and the screw actuatable for effecting a direct driving connection between the motor and the screw, and an over-running clutch means disposed in the drive train made up of said pinions and gears for permitting high speed rotation of said screw when the first mentioned clutch is actuated.

References Cited by the Examiner

UNITED STATES PATENTS 2,367,492    1/1945    Fickett et al. _____ 10—139
2,601,157    6/1952    Le Lan _____ 60—52

WILLIAM W. DYER, Jr., *Primary Examiner.*

G. A. DOST, *Assistant Examiner.*